United States Patent Office 3,506,409
Patented Apr. 14, 1970

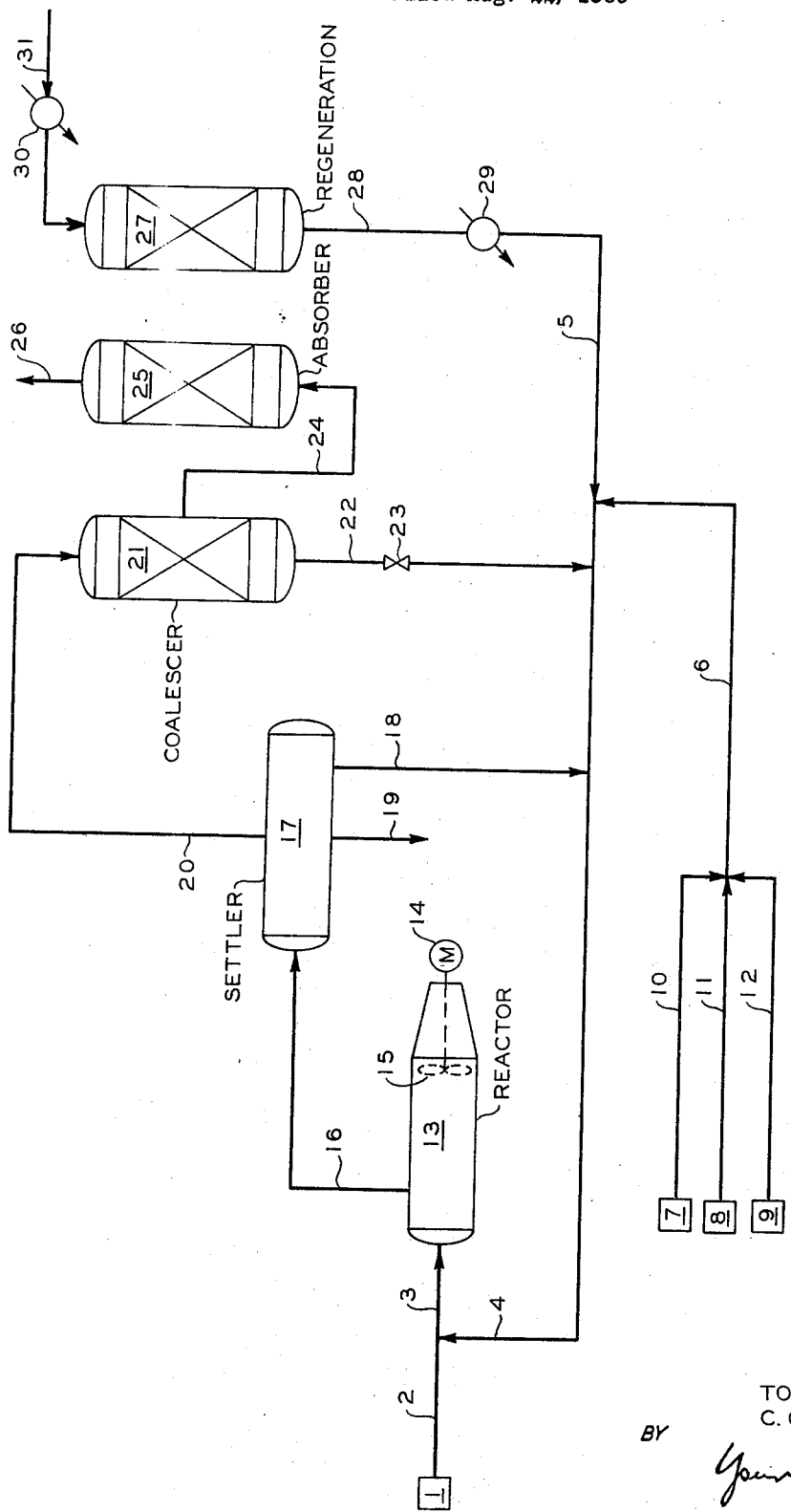

3,506,409
REMOVING METAL HALIDES FROM ALKYLATION REACTION PRODUCTS
Tom Hutson, Jr., and Cecil O. Carter, Bartlesville, Okla., assignors to Phillips Petroleum Company, a corporation of Delaware
Filed Aug. 22, 1966, Ser. No. 574,040
Int. Cl. B01d 15/08
U.S. Cl. 23—312          7 Claims

ABSTRACT OF THE DISCLOSURE

Process for removing residual amounts of metal halides from alkylate streams by passing the alkylate through a first saturated coalescing zone and then through an active adsorption zone while the third zone is being regenerated, after which the several zones are cycled to allow the regeneration of the saturated zone and the use of the regeneration zone as the active adsorber.

---

This invention relates to a method for coalescing and adsorbing metallic halides.

In another aspect, the invention relates to a method of coalescing metallic halides in a mixture containing at least one halide by contacting with a halide supporting material having an adsorbing surface substantially loaded with metallic halides.

In another aspect, the invention relates to a method for coalescing metallic halides, and for removing them from mixtures containing them by passing the mixture through a coalescing zone containing metallic halide supporting material having a surface substantially loaded with halides, then passing the mixture to a zone containing a material, which has a non-loaded adsorbing surface.

In still another aspect, the invention relates to a method of coalescing and removing metallic halides from mixtures containing them wherein the zone containing metallic halide supporting material having a non-loaded adsorbing surface is used as a coalescing zone after the surface becomes loaded with metallic halides.

In another of its aspects, the invention relates to a method of coalescing and removing metallic halides from mixtures containing them as described above which further comprises removing metallic halides from the coalescing zone after the interstitial volume of the metallic halide supporting material therein becomes loaded with metallic halides.

It is known in the art to use metallic halide supporting materials having a non-loaded adsorbing surface for removing metallic halides from mixtures containing them by contact with said material. When such mixtures contain only a small amount of metallic halides, however, substantially complete removal of the halides by this process is difficult to accomplish because the halides are usually dispersed as small particles throughout the mixtures. It is an object of this invention to provide a method which permits substantially complete removal of metallic halides from mixtures containing them even when the halides are present in small, well-dispersed amounts. It is a particular object of the invention to obtain substantially complete removal of aluminum halides from detergent grade alkylates and diisopropyl alkylates.

Other aspects, objects, and the several advantages of the invention are apparent from a study of the specification, drawing and the appended claims.

In accordance with the practice of this invention, a method of coalescing and removing solid metallic halides in a mixture containing at least one of these halides comprises connecting the mixture with a support for the halides, the adsorbing surface of which is substantially loaded with the halides. After coalescing and removing the solid metallic halides, the remaining mixture is advantageously passed therefrom to a zone containing a support for the halides having a non-loaded adsorbing surface, wherein the dissolved metallic halides are removed from the mixture by adsorption. The zone containing a support having a non-loaded adsorbing surface will eventually have the adsorbing surface loaded, whereupon it can be switched to the coalescing zone. Periodically, it is necessary to regenerate the metallic halide supporting materials from the coalescing zone by removing metallic halides therefrom because the interstitial volume of the support material eventually becomes loaded with metallic halides, and mixtures will no longer pass through at a desirable rate when this occurs; after regeneration, the metallic halide supporting materials can be returned to the zone for adsorbing dissolved metallic halides. It is important that the zone containing a support for the halides, the adsorbing surface of which is substantially loaded with the halides, be maintained under non-reactive conditions to insure that coalescing will occur.

The support materials used in the practice of this invention are usually fine mesh, adsorbent clays, such as attapulgus clay, activated alumina, Porocel (activated bauxite), etc. Such materials are especially suitable for removing metallic halides such as aluminum chloride, aluminum bromide, aluminum iodide, antimony chloride, aluminum fluoride, and combinations of these.

The drawing represents diagrammatically a system to which the process of this invention can be applied.

In the drawing, reactants and catalysts are mixed by means of stirrer 15, driven by motor 14, in reactor 13. The effluent from the reactor passes through line 16 to settler 17, wherein the bulk of the catalyst separates from the product, which could be, for example, a detergent grade alkylate. The catalyst can be recycled to the reactor via lines 18, 4, and 3, or can be drained from the settler through line 19.

The partially purified product material passes through line 20 to coalescing zone 21, which contains supporting material for the metallic halides having an adsorbing surface substantially loaded therewith, and is maintained under non-reactive conditions. Partially purified product passing thereto typically contains well-dispersed metallic halides which tend to coalesce and remain in the interstitial volume between the adsorbing particles in zone 21. The mixture now containing dissolved metallic halides passes via line 24 to adsorbing zone 25, which contains an adsorbing material having a non-loaded surface, and the dissolved metallic halides are adsorbed thereon. Substantially pure product passes from zone 25 through line 26.

When the adsorbing surface of the material in zone 25 becomes loaded with metallic halides, the bed of material can be switched to coalescing zone 21. When the interstitial volume of support material in zone 21 becomes plugged with metallic halides, it is necesary to remove the halides from this zone so as to regenerate the adsorbing and coalescing power of the support material. In the drawing, zone 27 is shown on the regeneration cycle, which can be accomplished, for example, by flushing a suitable solvent for the metal halides through the zone, by heating the material therein, by burning off the solvent using steam and/or air, or by any combination of these or other techniques. Heated solvent after passing through line 31, heater 30, zone 27, line 28, and cooler 29, can be recycled to reactor 13 with the entrained catalyst via lines 5, 4 and 3.

Reactants, catalysts, etc., can be fed to reactor 13 from zones 1, 7, 8, and 9, via lines 2, 10, 11, 12, and 6, respectively, to initiate the operation of the system.

It will be understood that rotation of the zones from regeneration to adsorption to coalescence, etc., can be accomplished by inter-zonal piping, which is not shown in the drawing for purposes of simplicity. Further, although only one zone is shown for each function, there can be more than one zone accomplishing each of the functions.

EXAMPLE

This example demonstrates the effectiveness of the process of this invention as applied to the removal of residual aluminum chloride in an alkylate effluent. Items (1) and (2) below, indicate the effectiveness of coalescing the aluminum chloride before removing it from the alkylate by adsorption.

Equipment:
    Reactor volume—2.0 gal. (Attapulgus clay 20–60 mesh)
    Settler volume—2.56 gal.
    Coalescer volume—2.0 gal.
    Clay charged to coalescer and adsorber—9.3 lbs.

Process conditions:
    Reactor temperature—90° F.
    Coalescer temperature (non-reactive)—85° F.
    Reactor pressure—50 p.s.i.g.
    Catalyst concentration (in reactor effluent)—30 volume percent
    $R^1$ Cl+paraffin charge rate—9.71 pounds/hour
    Recycle benzene (70% by volume)—12.68 pounds/hour
    Make-up benzene (30% by volume)—5.43 pounds/hour
    Recycle heavy alkylate—0.48 pound/hour

[1] R=hydrocarbon.

Results:
    (1) $AlCl_3$ concentration (as Al) exit coalescer—40 parts/million by weight
    (2) $AlCl_3$ concentration (as Al) exit adsorber—4 parts/million by weight Process cycle for coalescer, adsorber and regeneration Normal aluminum concentration in the coalescer effluent was in the range of 40–60 parts per million. Therefore, the cycle was designed for an aluminum concentration of 100 parts per million.

The cycle was determined as the minimum life that can be expected for the bed in the $AlCl_3$ adsorber position:

(300 pounds hydrocarbon/pound clay)

$$\frac{(9.3 \text{ pounds clay})}{28.3 \text{ pounds hydrocarbon/hour}} = 98.6$$

For operational considerations, adsorber cycle was set at 96 hours.

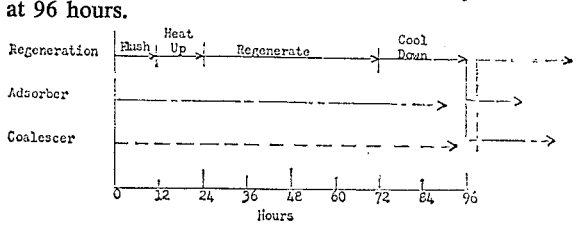

The regeneration cycle was as follows:
    (1) 12 hour wash with benzene at ambient temperature to recover free $AlCl_3$,
    (2) 12 hour heating period,
    (3) 48 hour hot benzene wash at 375° F. to remove adsorbed $AlCl_3$, and
    (4) 24 hour cooling time.

After 96 hours (total time in this position), the bed was switched to the adsorber position. Then the adsorber was switched to the coalescer position, and finally the coalescer was switched to regeneration position.

Reasonable variation and modification are possible within the spirit and scope of the foregoing invention, the essence of which is a method of coalescing metallic halides in a mixture containing at least one of the halides comprising contacting the mixture in a non-reactive condition with the support for said halide, the adsorbing surface of which is substantially loaded with said halides. After removal of solid metallic halides, dissolved metallic halides may be removed by contacting the mixture with the support for said halide having the surface thereof in an adsorbing condition. The completely loaded support material can be regenerated and returned to adsorptive service.

We claim:
1. A method for removing metal halides selected from aluminum halides and antimony chloride from a liquid mixture containing materials selected from alkylates and diisopropyl alkylates previously partially purified of said metallic halides but which contain residual amounts of at least one of said halides dispersed and dissolved therein comprising first contacting said mixture in a coalescing zone under non-reactive conditions with an adsorbent clay support for said halides to cause said dispersed metallic halides to coalesce and remain in the interstitial volume between the adsorbing particles in said coalescing zone, the adsorbing surface of said support being substantially loaded with said halides prior to said contacting, and then passing said mixture freed of dispersed metallic halides to an adsorption zone containing an adsorbent clay support for said halides having a non-loaded adsorbing surface to remove dissolved metallic halides, and recovering a substantially pure alkylate product freed of dispersed and dissolved metallic halides.

2. A method according to claim 1 wherein said metallic halide is aluminum trichloride and said material is diisopropyl alkylate.

3. A method according to claim 1 wherein said adsorbent clay supports are used consecutively to (1) coalesce traces of dispersed aluminum trichloride catalyst from alkylate, (2) adsorbing traces of dissolved aluminum trichloride catalyst from alkylate, and (3) is then regenerated to remove coalesced and adsorbed aluminum trichloride catalyst, with the further proviso that the alkylate flows from a settling zone to the coalescing step (1) from which the separated catalyst upon regeneration is recycled to an alkylation zone (2) and the alkylate removed from the coalescing is passed to the adsorption step.

4. A method as defined in claim 1 wherein the zone containing the said support having a non-loaded adsorbing surface is used as a coalescing zone after said adsorbing surface becomes loaded with said halides.

5. A method as defined in claim 4 wherein said halides are removed from said coalescing zone after the interstitial volume of said support becomes loaded with said halides.

6. A method as defined in claim 5 wherein said mixture consists of the effluent from a settler wherein the majority of said halides are removed from said mixture.

7. A method as defined in claim 6 wherein the mixture passing to said settler comprises the effluent from an alkylation zone.

(References on following page)

References Cited

UNITED STATES PATENTS

| | | | |
|---|---|---|---|
| 2,946,833 | 7/1960 | Kimberlin | 260—683.53 X |
| 3,000,995 | 9/1961 | Hofmann | 260—683.53 X |
| 3,004,082 | 10/1961 | Meisinger | 260—683.53 X |
| 3,045,056 | 7/1962 | Schriesheim | 260—683.57 X |
| 3,071,635 | 1/1963 | Glaser | 260—683.53 X |
| 3,113,988 | 12/1963 | Meisinger | 260—683.53 |

NORMAN YUDKOFF, Primary Examiner

S. J. EMERY, Assistant Examiner

U.S. Cl. X.R.

23—96; 252—463; 260—683.53, 683.57